(12) United States Patent
Yu et al.

(10) Patent No.: US 9,702,962 B2
(45) Date of Patent: Jul. 11, 2017

(54) METHOD FOR PROVIDING VEHICLE INFORMATION AND TERMINAL DEVICE APPLYING THE SAME

(75) Inventors: Seung-dong Yu, Gyeonggi-do (KR); Woo-yong Chang, Gyeonggi-do (KR); Se-jun Park, Gyeonggi-do (KR); Min-jeong Moon, Gyeonggi-do (KR)

(73) Assignee: Samsung Electronics C (KR)

( * ) Notice: Subject to any disclaimer, the term of this patent is extended or adjusted under 35 U.S.C. 154(b) by 796 days.

(21) Appl. No.: 12/868,421

(22) Filed: Aug. 25, 2010

(65) Prior Publication Data
US 2011/0050463 A1   Mar. 3, 2011

(30) Foreign Application Priority Data

Aug. 25, 2009  (KR) .................. 10-2009-0078792
Aug. 20, 2010  (KR) .................. 10-2010-0080936

(51) Int. Cl.
| G08G 1/133 | (2006.01) |
| G01S 5/00 | (2006.01) |
| G08G 1/123 | (2006.01) |
| G01S 19/42 | (2010.01) |

(52) U.S. Cl.
CPC ............ *G01S 5/0027* (2013.01); *G08G 1/123* (2013.01); *G08G 1/133* (2013.01); *G01S 19/42* (2013.01)

(58) Field of Classification Search
USPC .. 340/988, 995.25, 539.13, 993, 994, 13.24, 340/539.17
See application file for complete search history.

(56) References Cited

U.S. PATENT DOCUMENTS

| 7,383,123 B2 * | 6/2008 | Park ........................... 701/411 |
| 2002/0069017 A1 | 6/2002 | Schmier et al. |
| 2007/0152850 A1 * | 7/2007 | Pechenick et al. ......... 340/988 |
| 2010/0153004 A1 * | 6/2010 | Natsume ..................... 701/201 |

FOREIGN PATENT DOCUMENTS

| CN | 1848190 | 10/2006 |
| CN | 2881549 | 3/2007 |
| CN | 101354258 | 1/2009 |
| CN | 101453283 | 6/2009 |
| CN | 101465063 | 6/2009 |
| GB | 2 382 709 | 6/2003 |

(Continued)

OTHER PUBLICATIONS

Korean Office Action dated Nov. 25, 2016 issued in counterpart Appln. No. 10-2010-0080936, 11 pages.

(Continued)

*Primary Examiner* — Brent Swarthout
(74) *Attorney, Agent, or Firm* — The Farrell Law Firm, P.C.

(57) ABSTRACT

A vehicle information providing method and a terminal applying the same are provided. The vehicle information providing method includes communicably connecting to a Global Positioning System (GPS) mounted on a vehicle, receiving location information from the GPS and receiving vehicle information from a vehicle information system based on the received location information. Accordingly, the terminal may receive the location information of the vehicle inside the vehicle even though the terminal has no GPS.

20 Claims, 11 Drawing Sheets

(56) References Cited

FOREIGN PATENT DOCUMENTS

| | | | |
|---|---|---|---|
| JP | 2002-073574 | | 3/2002 |
| JP | 2004-062763 | | 2/2004 |
| JP | 2004-117285 | | 4/2004 |
| JP | 2004-314734 | | 11/2004 |
| JP | 2007-502455 | | 2/2007 |
| JP | WO/2008/142783 | * | 11/2008 |
| KR | 1020050015592 | | 2/2005 |
| KR | 1020050060719 | | 6/2005 |
| KR | 1020060039695 | | 5/2006 |
| KR | 1020060087067 | | 8/2006 |
| KR | 1020070052925 | | 5/2007 |
| KR | 1020070065473 | | 6/2007 |
| KR | 100755500 | | 8/2007 |
| KR | 1020080044112 | | 5/2008 |

OTHER PUBLICATIONS

Chinese Office Action dated Sep. 4, 2014 issued in counterpart Appln. No. 201080034757.2.

* cited by examiner

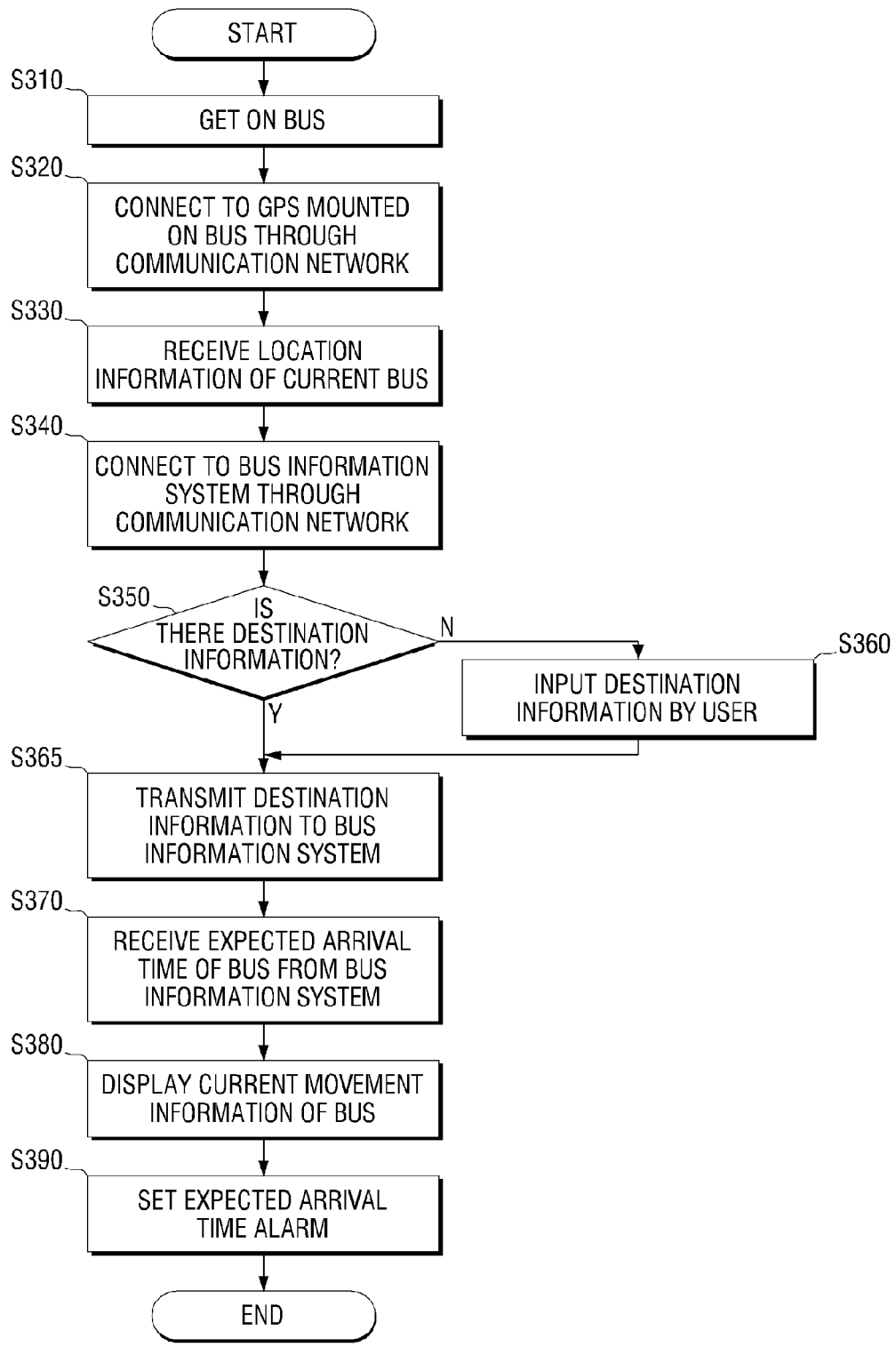

METHOD FOR PROVIDING VEHICLE INFORMATION AND TERMINAL DEVICE APPLYING THE SAME

PRIORITY

This application claims priority to Korean Patent Application Nos. 2009-78792 and 2010-0080936, filed in the Korean Intellectual Property Office on Aug. 25, 2009 and Aug. 20, 2010, respectively, the disclosures of which are incorporated herein by reference.

BACKGROUND OF THE INVENTION

1. Field of the Invention

The present invention generally relates to a method for providing vehicle information and a mobile terminal device using the same, and more particularly, to a method for providing information regarding location of the vehicle that a user gets on and a terminal device using the same.

2. Description of the Related Art

When a user uses a bus as public transportation, the user often does not know which bus number the user should take to arrive at a destination, which route the bus would take to arrive the destination, and where the bus stops are located.

In addition, while on the bus, the user still may not know when the bus is scheduled to arrive at the destination. If the user gets on a bus in an area which the user visits for the first time, the user may have no idea where the bus is currently located and how much further the bus must travel to arrive at the destination.

When using a bits, a user usually wishes to know which bus line he or she is on, what the current location is, and when the bus would arrive at a destination. Accordingly, a method for informing the user of the kind of bus line, the current location of the bus, and the expected arrival time is required.

SUMMARY OF THE INVENTION

Aspects of the embodiments of the present invention relate to a method for providing vehicle information by communicably connecting to a Global Positioning System (GPS) mounted on the vehicle, receiving location information from the GPS, and receiving vehicle information from a vehicle information system based on the received location information, and a mobile terminal device using the same.

In accordance with an aspect of the present invention, a vehicle information providing method includes communicably connecting to a GPS mounted on a vehicle, receiving location information from the GPS, and receiving vehicle information from a vehicle information system based on the received location information.

The method further includes setting a destination according to a user's manipulation.

The method further includes identifying an expected arrival time when the vehicle is expected to arrive at a destination based oil the location information and the vehicle information.

The method further includes setting an alarm at a predetermined time before the vehicle arrives at the destination.

The method further includes setting an alarm at a predetermined distance before the vehicle arrives at the destination.

The method further includes displaying current movement information of a vehicle based on the location information and the vehicle information.

The method further includes inactivating an internal GPS if communicable connection with a GPS mounted on the vehicle is completed.

In accordance with another aspect of the present invention, a terminal includes a communication unit which is communicable connected to a GPS mounted on a vehicle and a controller which controls to receive location information from the GPS and to receive vehicle information from a vehicle information system based on the received location information.

The terminal further includes an internal GPS which receives location information, and the controller may inactivate the internal GPS if the communication unit is communicably connected to a GPS mounted on a vehicle.

According to another aspect of the present invention, a vehicle information providing method operable with a GPS mounted on a vehicle, receives location information from the GPS and receives vehicle information from a vehicle information system based on the received location information, and a terminal applying the same are provided. Accordingly, the terminal may receive the location information of the vehicle inside the vehicle even though the terminal lacks a GPS.

BRIEF DESCRIPTION OF THE DRAWINGS

The above and/or other aspects, features and advantages of the present invention will be more apparent from the following detailed description, taken in conjunction with the accompanying drawings, in which:

FIG. 3 is a flowchart of a method for providing bus information according to an embodiment of the present invention;

DETAILED DESCRIPTION OF EMBODIMENTS OF THE PRESENT INVENTION

Figure 1:
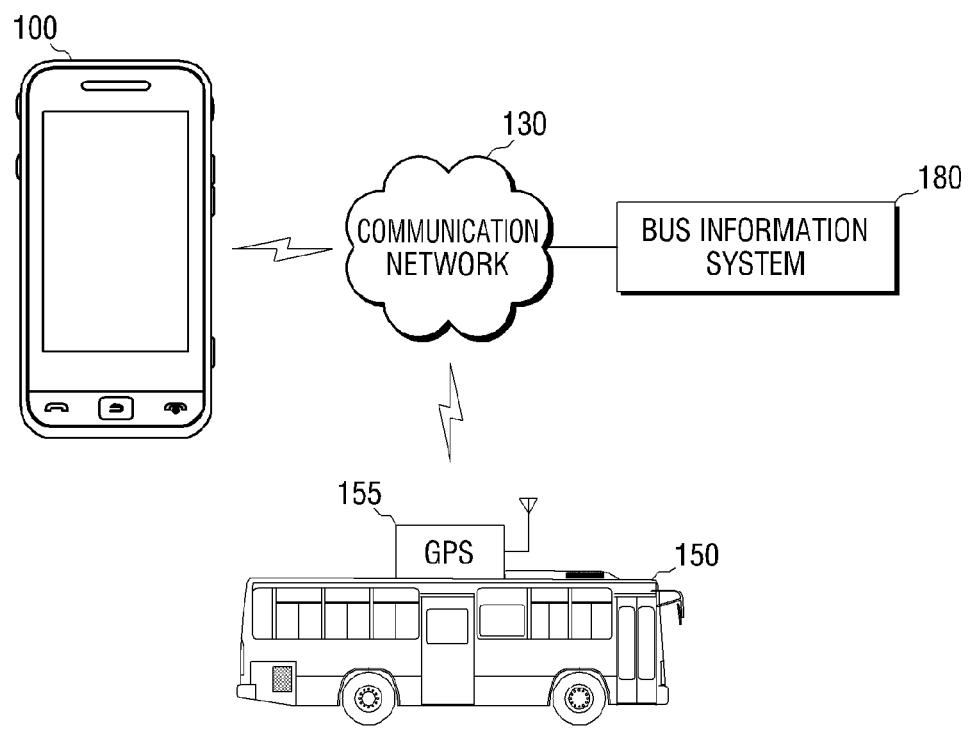
FIG. 1 illustrates a system for providing bus information according to an embodiment of the present invention.

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

As illustrated in FIG. 1, a bus information providing system includes a terminal 100, a GPS 155 mounted on a bus 150, and a bus information system 180, which are communicably connected with each other through a communication network 130. Herein, the communication network 130 represents various wired and wireless communication networks. For example, the communication network 130 may be realized through a Code Division Multiple Access (CDMA) network. In addition, the communication network 130 includes all wired/wireless circuit/packet communication networks including a base station, a Packet Data Serving Node (PDSN), and an Internet network.

The terminal 100 is connected to the bus information system through the communication network 130. In addition, the terminal 100 receives bus information from the bus information system 180. Herein, the bus information includes information regarding a bus number, a bus line, bus operation, a bus location, and an expected arrival time. Herein, the expected arrival time of a bus refers to a time when the bus 150 is expected to arrive at a predetermined destination.

In addition, the terminal 100 is connected to the GPS 155, which is mounted on the bus 150, through the communication network 130. The terminal 100 receives information regarding the location of a bus from the GPS 155. Accordingly, as the terminal 100 is communicably connected to the GPS 155 mounted on the bus 150, the terminal 100 may receive information regarding the current location of a bus without a GPS.

Even if a GPS is built inside the terminal 100, it is difficult to use the GPS of the terminal 100 inside a bus due to interference with reception of a GPS signal the ceiling of the bus 150. As a GPS is mounted on the bus 150, the terminal 100 may receive location information from the GPS mounted on the bus 150 without such interference.

The terminal 100 receives information regarding the bus 150 on which a user currently gets on from the bus information system 180 based on the location information received through the GPS 155. Accordingly, the terminal 100 receives information regarding a bus number, a bus line, a bus location, and an expected arrival time. Therefore, the terminal 100 may recognize in information regarding the bus on which a user is presently riding.

The GPS 155 mounted on the bus 150 receives location information from a satellite (400 in FIG. 4B), and transmits the received location information to the bus information system 180 and the terminal 100.

The bus information system 180 manages overall information regarding bus management. The bus information system 180 receives information from buses in operation, processes and stores the information, and transmits the information to where the information is required. The bus information system 180 may have a Geographical Information System (GIS). The bus information database of the bus information system 180 stores information regarding local maps (such as building and roads) and bus stops of each bus, typically by bus. The information regarding bus stops may be displayed on the map by overlapping each other. In addition, the bus information database stores information regarding a bus number, a bus line, bus operation, a bus location, and an expected arrival time.

The bus information system 180 supports a Wireless Application Protocol (WAP), and may communicate with the terminal 100 connected to the communication network 130. In addition, the bus information system 180 receives location information from the GPS 155 mounted on the bus 150, and transmits the bus information to the terminal 100 through the communication network 130.

As such, the terminal 100 included in the bus information providing system is connected to the GPS 155 mounted on the bus 150 and receives location information from the GPS 155.

Figure 2:
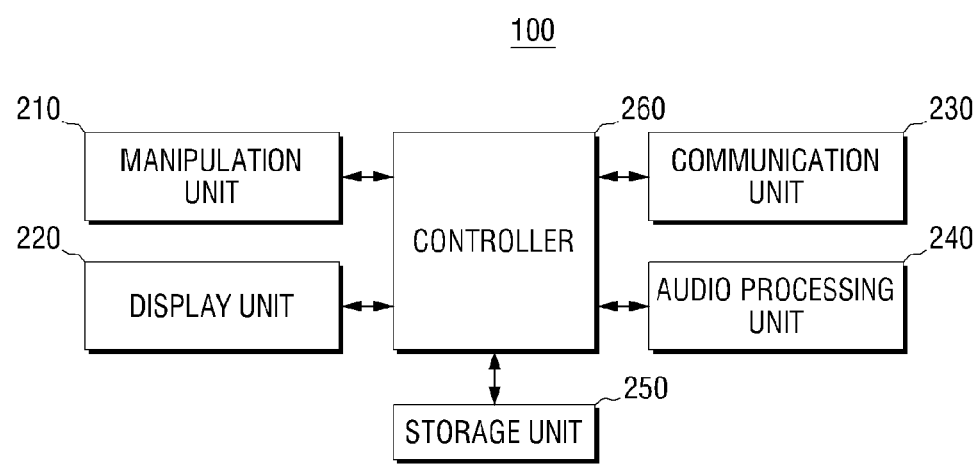
FIG. 2 is a block diagram illustrating a structure of a mobile terminal 100 according to an embodiment of the present invention.

Referring to FIG. 2, the manipulation unit 210 receives a command through a user's manipulation. The manipulation unit 210 may be formed on the surface of the terminal 100 in the form of a button or may be formed on the display in the form of touch screen.

The display unit 220 displays images of program development, a user's menu selection screen, and a telephone communication screen. In addition, the display unit 220 may display various video data after performing graphic processing on the video data. The display unit 220 also displays images regarding the bus information on the screen thereof.

The communication unit 230 is communicably connected to the GPS 155 mounted on the bus 150 and the bus information system 180 through the communication network 130.

The audio processing unit 240 performs audio-encoding on the audio signal which is generated with the sound of a user speaking through a microphone. In addition, the audio processing unit 240 transmits the processed signal to the controller 260. The audio processing unit 240 performs audio-decoding on the audio reception signal, i.e. the voice of a counterpart, which is received through the communication unit 230 and demodulated. The audio processing unit 240 also outputs the processed audio reception signal through a speaker.

The audio processing unit 240 includes an analog circuit such as a codec, an amplifier, and a filter which performs compression and decompression on audio data, and includes an analog/digital conversion circuit and a digital/analog conversion circuit.

The storage unit 250 stores an operation program and a system program of the controller 260. Such programs are stored in a Read Only Memory (ROM) area included in the storage unit 250 and may be cancelled if necessary. In addition, the storage unit 250 includes Random Access Memory (RAM) which stores data temporarily while performing various operation programs. The storage unit 250 stores program data to perform a bus information providing method according to an exemplary embodiment.

The controller 260 controls overall operation of the terminal 100. The controller 260 demodulates a signal received through the communication unit 230. The controller 260 modulates a signal to be transmitted through the communication unit 230 and transmits the modulated signal to the communication unit 230. In this case, the controller 260 performs modulation/demodulation for mobile communication. For example, the controller 260 may perform CDMA modulation/demodulation such as channel coding decoding and orthogonal coding/decoding.

The controller 260 analyzes a signal received from a base station (not shown) and controls the manipulation unit 210, the display unit 220, the communication unit 230, the audio processing unit 240, and the storage unit 250 accordingly. In addition, the controller 260 controls the terminal according to a manipulation command input from the manipulation unit 210.

The controller 260 controls the communication unit 230 to be connected to the bus information system 180 through the communication network 130. In addition, the controller 260 controls the communication unit 230 to receive bus information from the bus information system 180. Herein, the bus information includes information regarding a bus number, a bus line, bus operation, a bus location, and an expected arrival time.

In addition, the controller 260 controls the communication unit 230 to be connected to the GPS 155 mounted on the bus 150 through the communication network 130. The controller 260 controls reception of information regarding a bus location from the GPS 155. Since the communication unit 230 is communicably connected to the GPS 155, which is mounted on the bus 150, the terminal 100 may receive information regarding a current location without the need for the terminal 100 to have its own GPS.

Even if a GPS is built inside the terminal 100, it is difficult to use the GPS of the terminal 100 inside a bus due to interference caused by the ceiling of the bus 150 with reception of a GPS signal. As the controller 260 receives location information from a GPS mounted on the bus 150, the controller 260 may control reception of the location information inside the bus 150 without such interference.

The controller 260 controls reception of bus information regarding the bus 150 on which a user is currently riding from the bus information system 180 based on location information received through the GPS 155. Accordingly, the controller 260 receives information regarding the bus number, the bus line, the location and the expected arrival time of the current bus. Therefore, the controller 260 may recognize bus information regarding the current bus.

As the controller 260 controls reception of location information from the GPS 155 mounted on the bus 150, the terminal 100 may receive the location information of the bus 150 inside the bus 150 without any interference even though the terminal 100 lacks a GPS.

In addition, the controller 260 may calculate an expected arrival time of the bus 150 using information regarding the bus line and the bus location. Specifically, the controller 260 identifies the current location of the bus 150 on the bus line using information regarding the bus line and the bus location. In addition, the controller 260 calculates a distance between a destination and a current location and an average speed of the bus 150. In this case, the controller 260 analyzes the severity of traffic congestion by receiving traffic information (for example. Transport Protocol Expert Group (TPEG) information), and calculates an average speed the bus 150 could have based on the received traffic information. The controller 260 may also calculate an expected arrival time using the distance between a destination and a current location and the average speed.

As such, the controller 260 may directly calculate the expected arrival time of the bus 150.

In addition, the controller 260 may set a destination using information of another terminal. For example, if a specific mobile phone number is input by a user, the controller 260 receives location information of the other terminal (i.e. mobile phone) from the mobile phone corresponding to the input mobile phone number, and sets the area where the mobile phone is located as a destination using the received location information.

As such, a destination may be set using only a telephone number of another terminal. Therefore, even if a user does not know the exact location of a person he or she wishes to meet, the user may easily figure out when the user is expected to arrive at the location where the person is simply by inputting a mobile phone number.

In addition, the controller 260 may display how close a destination is in real time. For example, the controller 260 may display a level of closeness to the destination as a percentage or in a graph on the screen. In this case, the closeness to the destination may be calculated based on the remaining time to get to the destination or the remaining distance to the destination.

As the level of closeness to a destination is displayed, a user may easily figure out how far the user should go further unit the destination.

Hereinafter, a process of providing bus information will be explained with reference to FIG. 3. As shown in FIG. 3, once a user boards a bus in step S310, the terminal 100 is connected to the GPS 155 mounted on the bus 150 through the communication network 130 in step S320. The terminal 100 receives location information of the bus 150 on which the user is currently riding from the GPS 155 in step S330. As the terminal 100 is communicably connected to the GPS 155 mounted on the bus 150, the terminal 100 may receive the current location information of the bus 150 without having its own GPS.

The terminal IOU connects to the bus information system 180 through the communication network 130 in step S340. Accordingly, the terminal 100 may receive bus information from the bus information system 180. Herein, the bus information includes information regarding a bus number, a bus line, bus operation, a bus location, and an expected arrival time of a bus.

Subsequently, the terminal determines whether there is information regarding a destination in the storage unit 250 in step S350. The destination information refers to the name or location of a destination to which a user wishes to travel. The destination information may be input by the user before or after the user boards the bus.

If it is determined that there is no information regarding a destination in the storage unit 250, the terminal 100 receives destination information from a user in step S360. In this case, the terminal 100 displays a window for inputting destination information on the screen so that the user may input destination information. In addition, the terminal 100 receives the destination information according to a user's manipulation.

The terminal 100 may also set a destination using information of another terminal. For example, if a specific mobile phone number of the other terminal is input by a user, the terminal 100 receives location information of the mobile phone from a mobile phone corresponding to the input mobile phone number. Subsequently, the terminal 100 sets the location of the other terminal as a destination using the received location information.

As such, the terminal 100 may set a destination only with a telephone number. Therefore, even if a user does not know the exact location of a person he or she wishes to meet, the user may easily figure out when the user is expected to arrive at the location where the person is simply by inputting a mobile phone number.

On the other hand, if in step 350 it is determined that there is a destination in the storage unit 250 of the terminal 100, which means the user input destination information in advance, the above-described a process of inputting destination information is omitted.

Subsequently, the terminal 100 transmits the destination information to the bus information system 180 in step S365. The bus information system 180 estimates and calculates an expected arrival time of the bus, and the terminal 100 receives the expected arrival time of the bus from the bus information system 180 in step S370.

The terminal 100 displays current movement information of the bus on the bus line using the location information received from the GPS 155 of the bus and the bus line information received from the bus information system 180 in step S380. Herein, the current movement information may be realized by displaying the current location of the bus on the bus line, as illustrated in FIG. 5D.

The terminal 100 sets an expected arrival time alarm according to a user's manipulation. Herein, the expected arrival time alarm represents a function of setting an alarm to provide an alert at a predetermined time or at a predetermined distance before the bus 150 arrives at the destination. For example, the terminal 100 may set an alarm so that the alarm provides an alarm five minutes before the bus 150 arrives at the destination. In addition, the terminal 100 may set an alarm to provide an alert one km before the bus 150 arrives at the destination.

As the terminal 100 receives location information from the GPS 155 mounted on the bus 150, the terminal 100 may receive the location information of the bus 150 inside the bus 150 without any interference even if the terminal 100 lacks a GPS.

In addition, the terminal 100 receives bus information regarding the bus 150 which a user currently traveling on from the bus information system 180 based on the received location information. Accordingly, the terminal 100 receives information regarding bus number, bus line, current location, and an expected arrival time of the current bus. Therefore, the terminal 100 may recognize bus information regarding the current bus.

In the above-described embodiment, an expected arrival time of a bus is received from a bus information system and the terminal 100 may calculate an expected arrival time of a bus from the bus information system. In this case, the terminal 100 may calculate an expected arrival time of the bits 150 using information regarding the bus line and the bus location. Specifically, the terminal 100 identifies where the bus 150 is currently located on the line using information regarding the bus line and the bus location. The terminal also calculates a distance between a destination and a current location. In addition, the terminal calculates an average speed of the bus 150. In this case, the terminal 100 analyzes severity of traffic congestion by receiving traffic information (e.g. TPEG information), and calculates an average speed the bus 150 could have based on the received traffic information. The terminal 100 may also calculate an expected arrival time using the distance between a destination and a current location and the average speed.

As such, the terminal 100 may directly calculate an expected arrival time of the bus 150.

In addition, the terminal 100 may display the proximity a destination and real time arrival. For example, the terminal 100 may display a level of closeness to the destination as a percentage or in a graph on the screen. In this case, the closeness to the destination may be calculated based on the remaining time arrive at the destination or the remaining distance to the destination.

As the terminal 100 displays the level of closeness to a destination, a user may easily figure out how far the user must travel to arrive at the destination.

Hereinafter, a process of receiving bus information using the terminal 100 that lacks a GPS will be further explained with reference to FIGS. 4A to 4D.

Figure 4A:
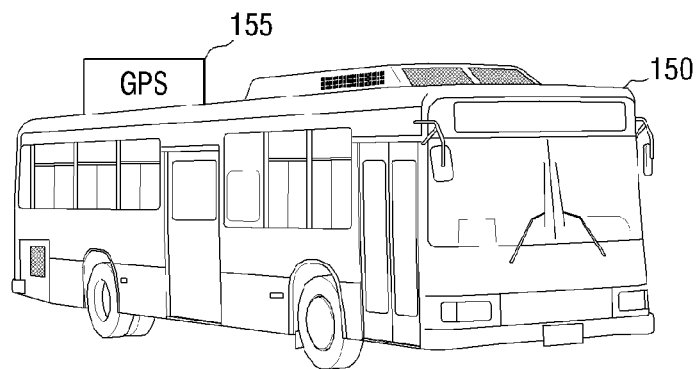
FIGS. 4A to 4D illustrate a process of receiving bus information using the terminal 100 lacking a GPS and performing a function of determining an expected arrival time alarm according to an embodiment of the present invention.
Figure 4B:
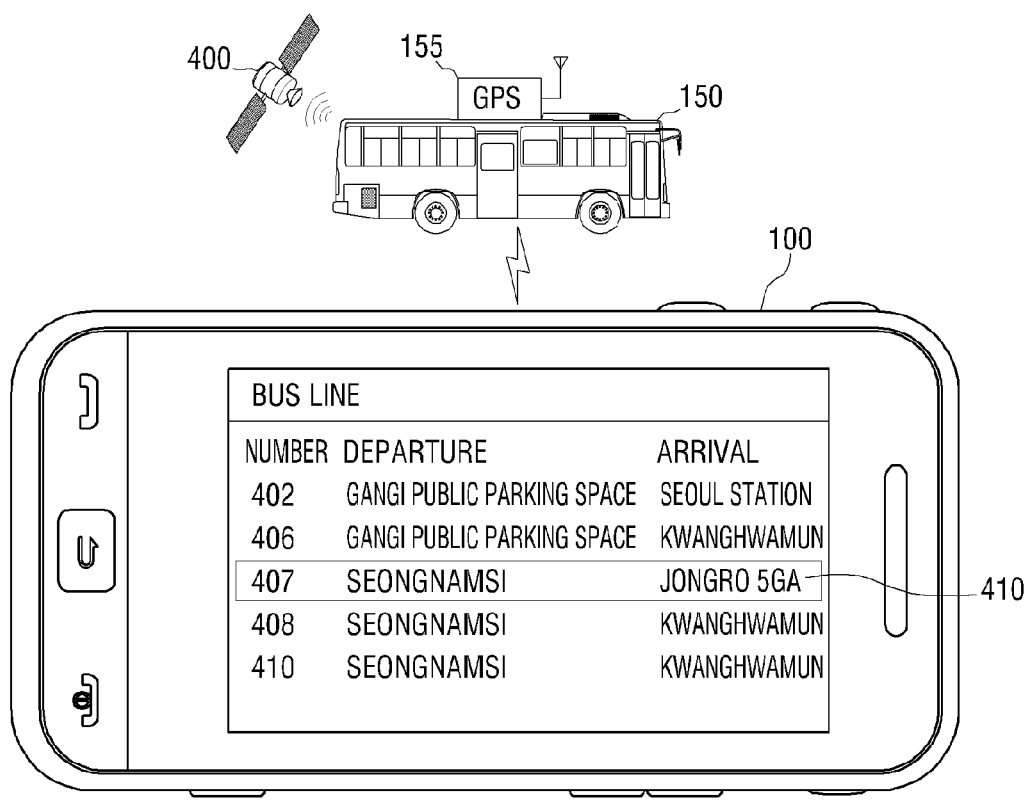

FIGS. 4A-4B illustrate the bus 150 on which the GPS 155 is mounted. A user boards the bus 150 on which the GPS 155 is mounted. The terminal is connected to the GPS 155 of the bus 150 through a wireless communication network. Subsequently, the GPS 155 communicates with a satellite 400 and receives coordinate information regarding current location of the bus 150.

The terminal 100 also receives bus information regarding the bus on which a user currently traveling from the bus information system 180.

FIG. 4B is a view illustrating a screen where information regarding the bus number and bus line is displayed. As illustrated in FIG. 4B, the GPS 155 of the bus 150 receives location information from the satellite 400. The terminal 100 is connected to the GPS 155 of the bus 150 and receives location information of the bus 150.

As illustrated in FIG. 4B, the terminal 100 highlights a bus line 410 on which the bus is currently traveling from among the bus lines in a bus line list. A current bus line 410 may be selected by the user or may be selected automatically by the terminal 100. If the terminal 100 selects the current bus line 410 automatically, the terminal 100 decides the current bus line 410 with reference to the bus information received from the bus information system 180.

Figure 4C:
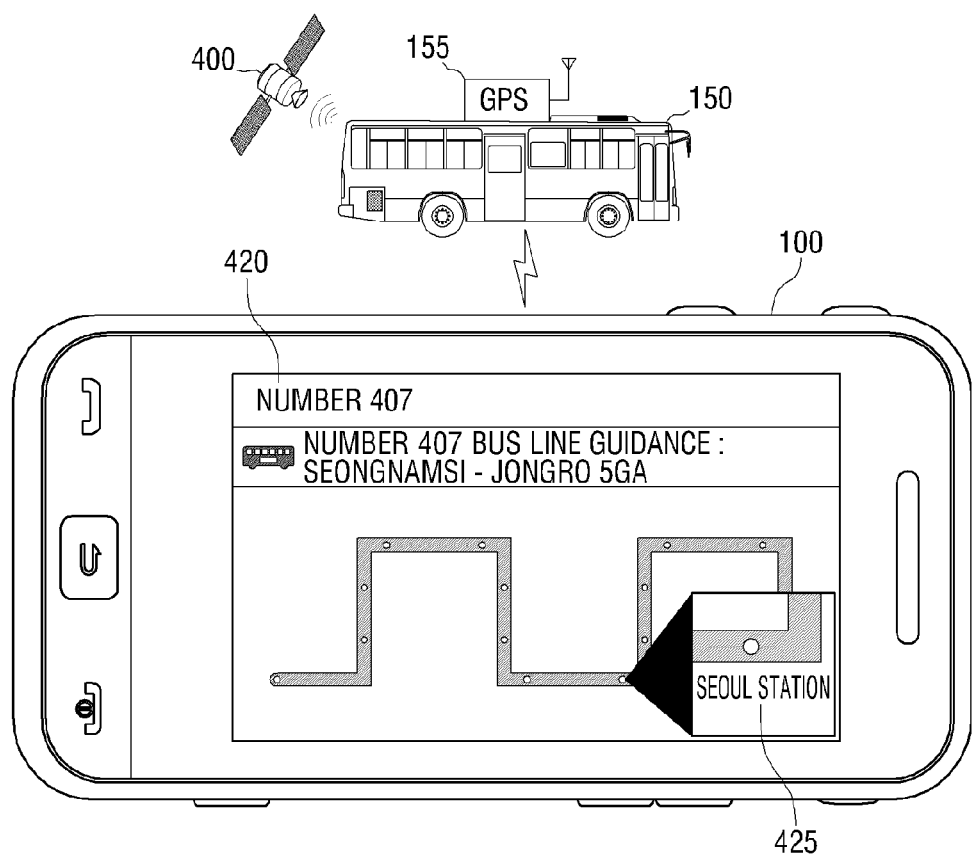

FIG. 4C illustrates a process of a user setting a destination on a screen where information regarding the bus line of a current bus is displayed. If the current bus line 410 is decided, the terminal 100 displays a bus line guidance screen 420 of the current bus, as illustrated in FIG. 4C. Herein, the bus line guidance screen 420 is a screen where the bus line of the current bus 150 is displayed as a one line path. In addition, the terminal 100 receives an input regarding a destination from a user while the bus line guidance screen 420 is displayed.

In FIG. 4C, a user touches an area corresponding to a Seoul station 425, and the terminal 100 sets the Seoul station 425 as a destination. As such, the terminal 100 receives an input regarding a destination through the bus line guidance screen 420. Therefore, the user may set a destination easily by touching a desired station on the bus line guidance screen 420. That is, the terminal 100 sets a destination by receiving a user's selection command from among a plurality of stations along the bus line displayed on the screen.

As such, if a destination is set by a user, the terminal 100 identifies an expected arrival time of the bus 150 with reference to the bus information received from the bus information system 180. Herein, the expected arrival time represents a time when the bus 150 is expected to arrive at the destination. The terminal 100 sets an expected arrival time alarm so that the alarm is set to provide an alert at a predetermined time or distance before the bus 150 arrives at the destination.

Figure 4D:
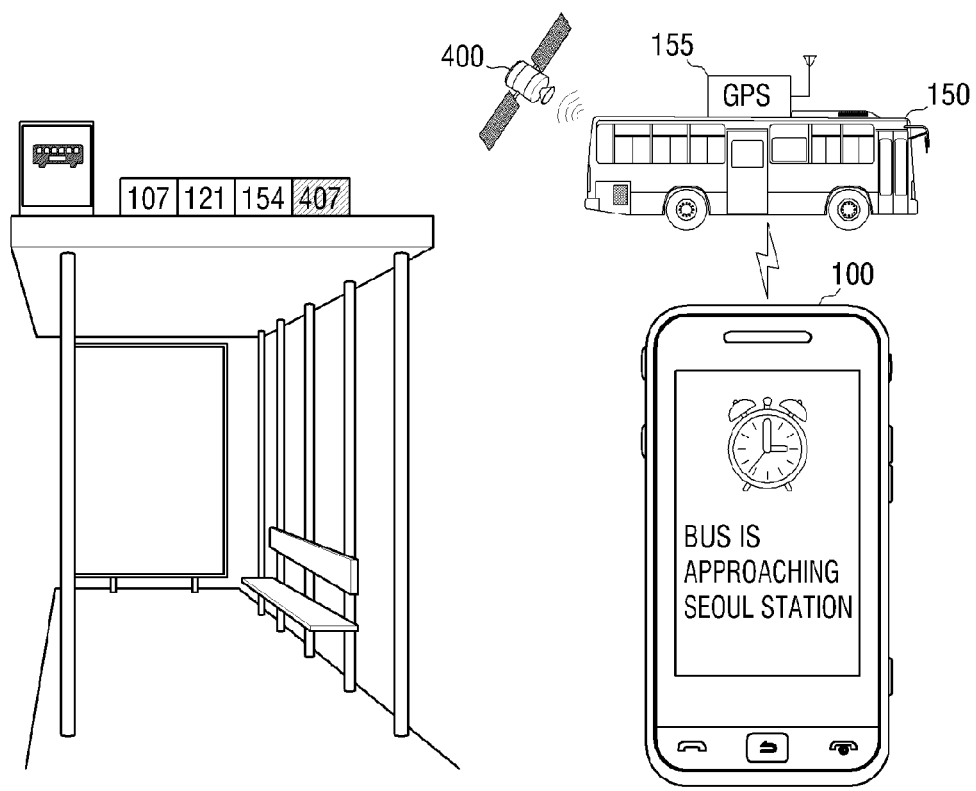

Accordingly, as shown in FIG. 4D, the terminal 100 provides an alarm before the bus 150 arrives at the destination station. Therefore, a user may easily figure out that the bus 150 is about to arrive at the destination without any additional manipulation on the terminal 100.

Hereinafter, a process of setting an expected arrival time alarm as a user directly inputs destination information will be explained with reference to FIGS. 5A to 5E.

Figure 5A:
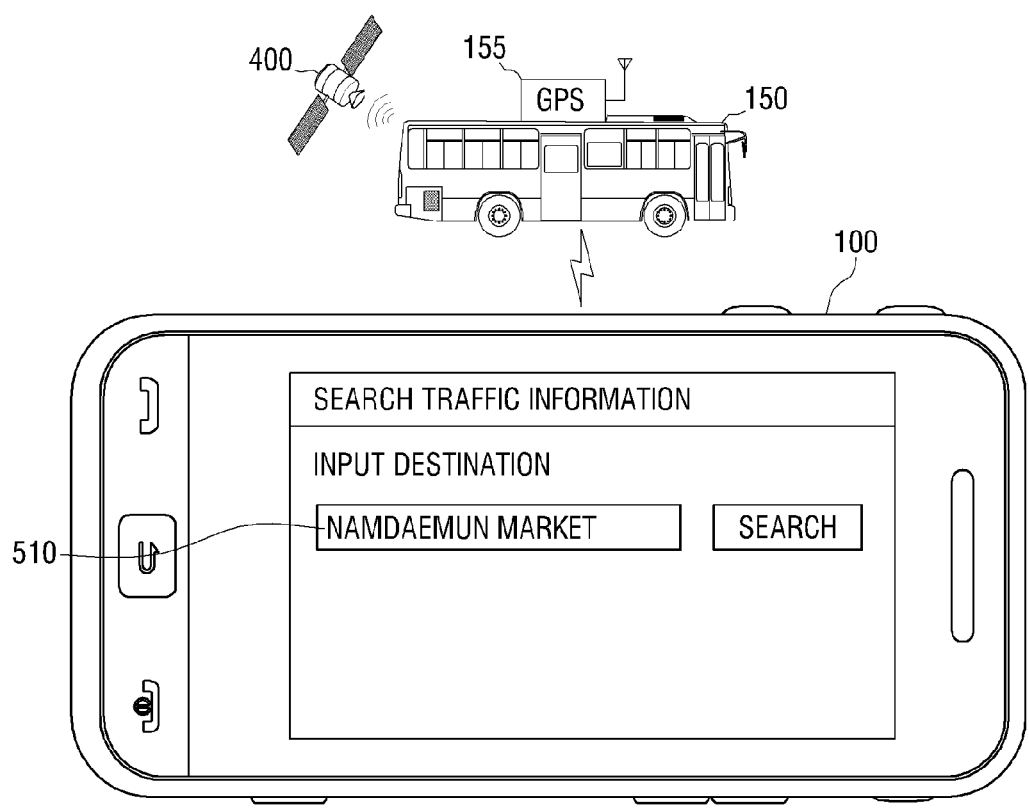
FIGS. 5A to 5E illustrate a process of setting an expected arrival time alarm as a user directly inputs destination information according to an embodiment of the present invention.

FIG. 5A is a view illustrating a screen where a destination input area 510 is displayed on a destination input window. As illustrated in FIG. 5A, a user may search a destination by directly inputting the destination.

Figure 5B:
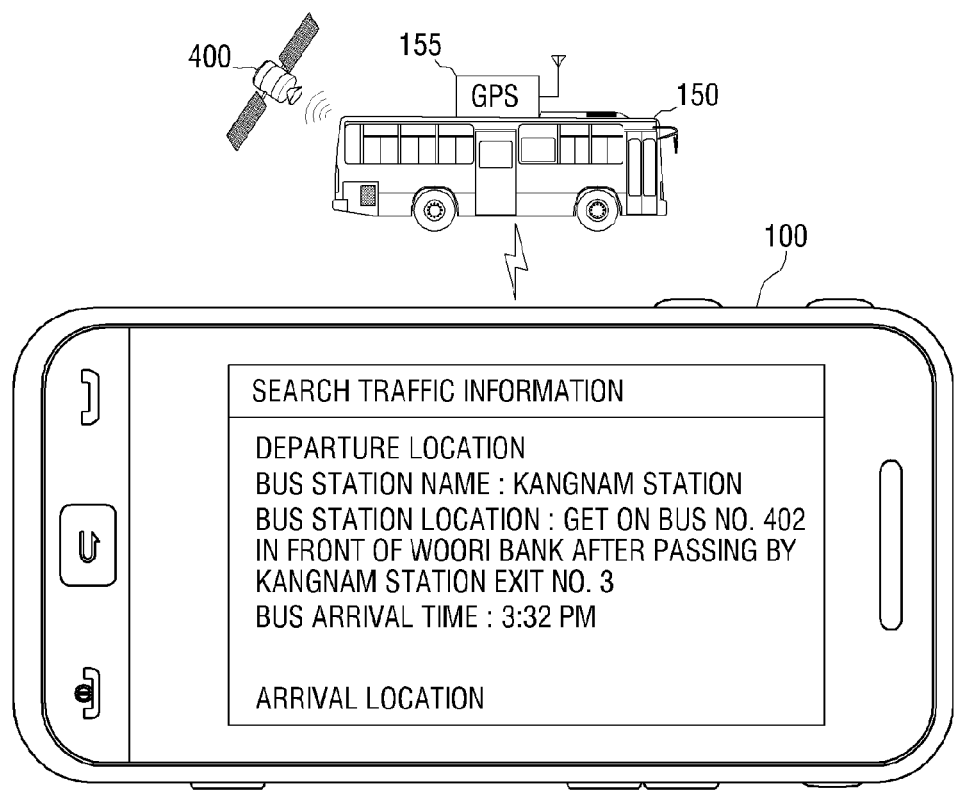
Figure 5C:
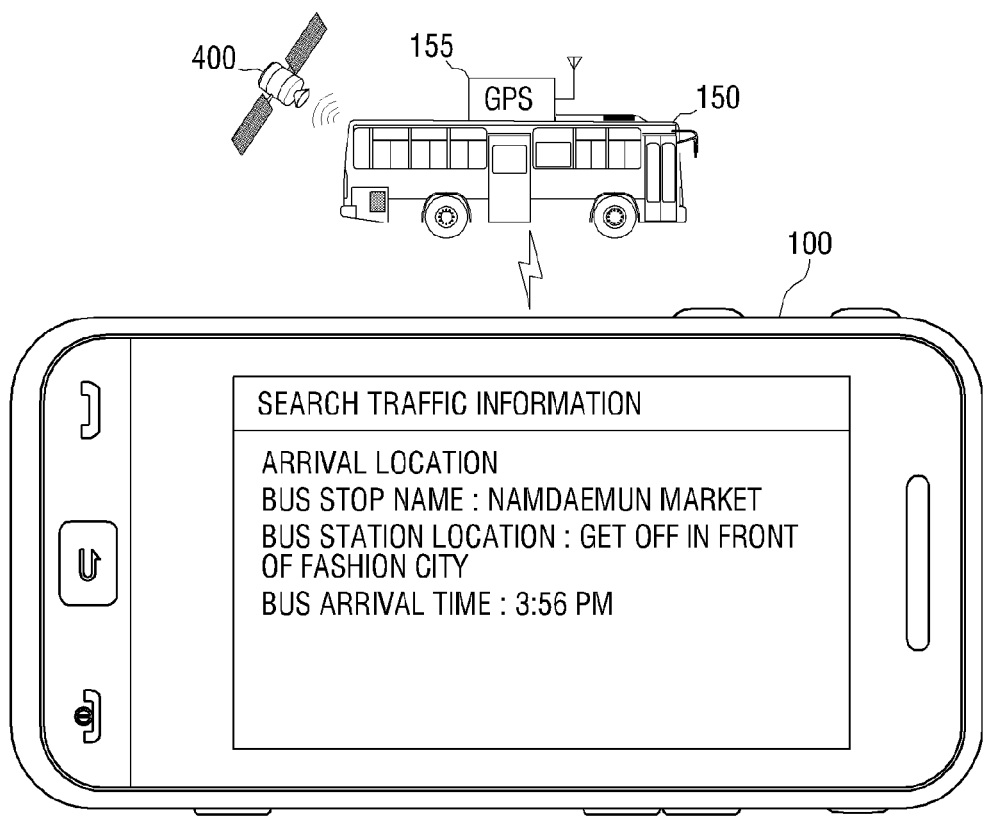
Figure 5D:
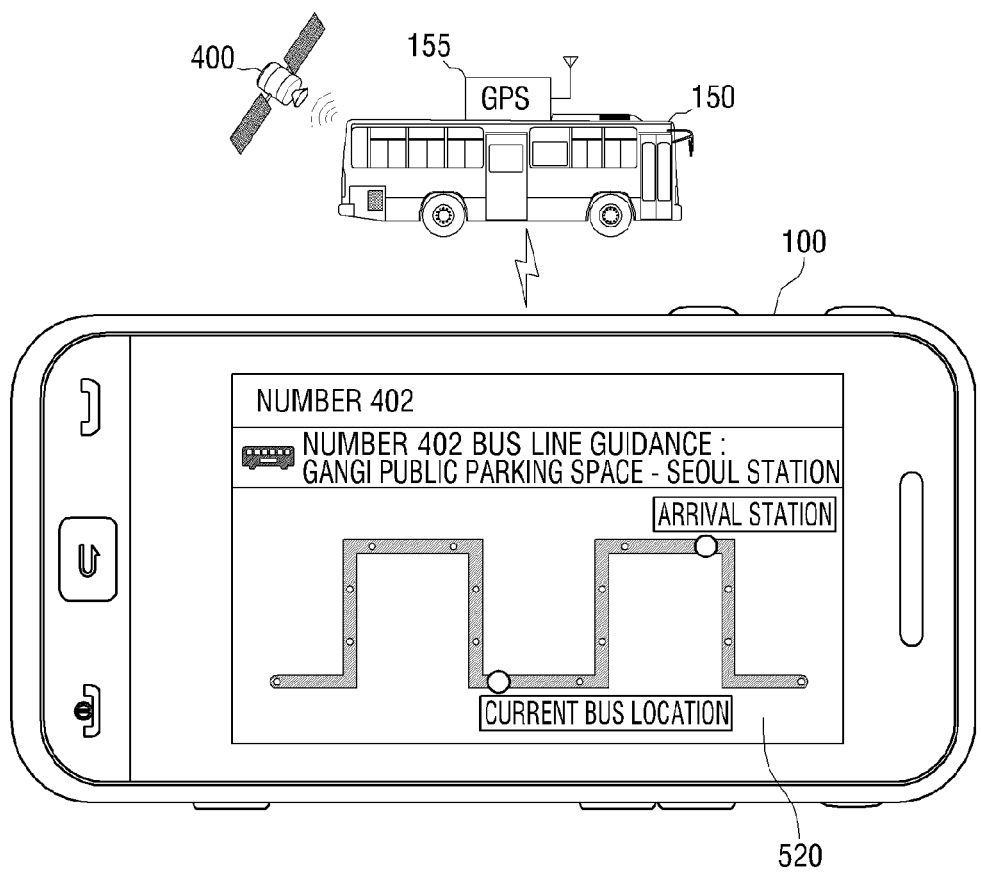

If the user inputs a destination in the destination input area 510 of FIG. 5A, the terminal displays information regarding a departure location and an arrival location on the screen, as illustrated in FIGS. 5B and 5C. In this case, the information regarding a departure location and an arrival location may be received from the bus information system 180 or may be searched by the terminal based on the current location.

FIG. 5B illustrates a screen on which information regarding a departure location is displayed. The terminal 100 sets a station where the bus 150 is currently located as a departure location and displays departure information on the screen using information regarding the current location.

FIG. 5C illustrates a screen on which destination information is displayed. The terminal 100 receives the destination information input by a user from the bus information system 180. The terminal 100 displays the received destination information on the screen. Herein, the destination information includes bus information received from the bus information system 180.

FIG. 5D illustrates a screen where the bus line guidance screen 520 of the current bus 150 is displayed. The terminal 100 displays the bus line guidance screen 520 utilizing bus line information received from the bus information system 180. In addition, as illustrated in FIG. 5D, an arrival station is displayed along with the current bus location on the bus guidance screen 520. Accordingly, a user may easily determine the current location of the bus which he or she gets on and a destination. As illustrated in FIG. 5D, the terminal 100 displays current movement information of the bus 150 on the bus line guidance screen 520.

Figure 5E:
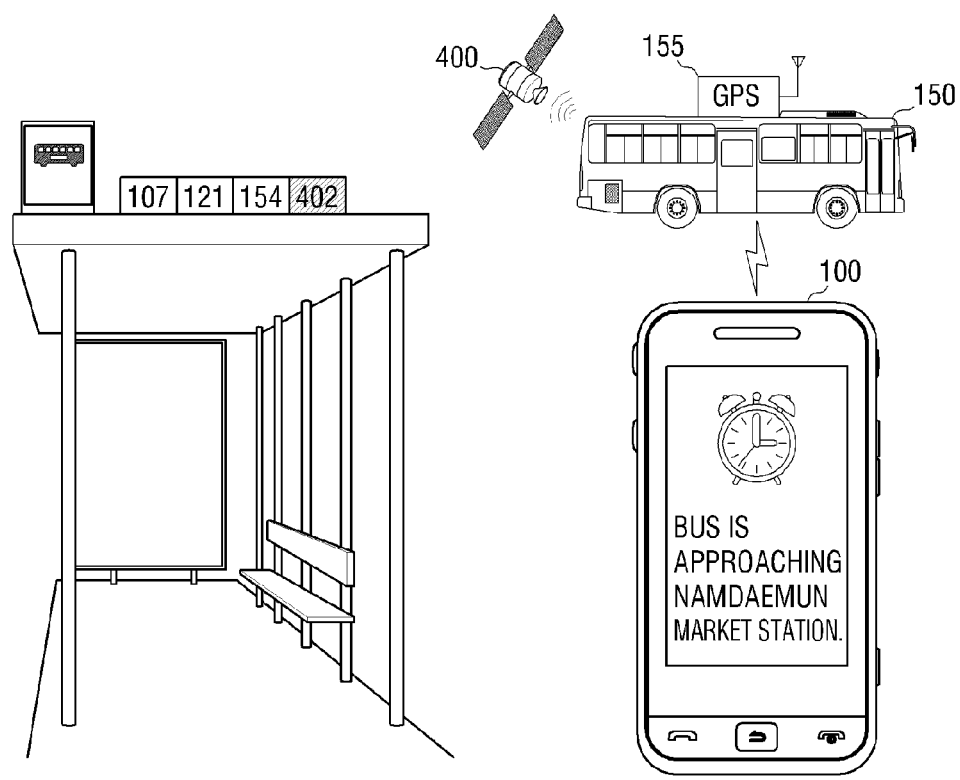

As such, if a user sets a destination, the terminal 100 identifies an expected arrival time of the bus 150 with reference to the bus information received from the bus information system 180. Herein, the expected arrival time represents a time when the bus 150 is expected to arrive at the destination. The terminal 100 sets an expected arrival time alarm so that the alarm is set off at a predetermined time or distance before the bus 150 arrives at the destination Accordingly, the terminal 100 sets off an alarm before the bus 150 arrives at the destination station as illustrated in FIG. 5E. Therefore, a user may easily figure out that the bus 150 is about to arrive at the destination without any additional manipulation on the terminal 100.

As the terminal 100 receives location information from the GPS 155 mounted on the bus 150, the terminal 100 may receive the location information of the bus 150 inside the bus 150 without any interference even though the terminal 100 lacks a GPS.

In addition, the terminal 100 receives bus information regarding the bus 150 which a user is currently riding from the bus information system 180 based on the location information received through the GPS 155. Accordingly, the terminal 100 receives information regarding bus number, bus line, current location, and an expected arrival time of the current bus. Therefore, the terminal 100 may recognize bus information regarding the current bus.

Accordingly, a user may view all stops on a bus line and set an expected arrival time alarm for any selected stop.

In the above exemplary embodiment, the terminal lacks a GPS, but this is only an example. The technical feature of the present invention may be applied to an apparatus with a GPS. In this case, if a user gets on a bus, the terminal 100 inactivates an internal GPS and connects to the GPS 155 of the bus 150 through a communication network. Since the internal GPS of the terminal 100 is often unable to detect a satellite signal inside the bus 150, the terminal 100 inactivates its internal GPS inside the bus 150 and uses the GPS 155 of the bus 150.

In the above exemplary embodiment, the terminal 100 may be any apparatus which can communicate with the bus 150. For example, the terminal 100 may be realized as mobile phone, MP3 player. PDA, or notebook computer.

In the above embodiment, a bus is taken as an example of vehicle, but this is only an example. The technical feature of the present invention could be applied to any vehicle with a GPS. For example, vehicle could be a passenger car, a truck, a subway or a train.

Although the preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing vehicle information, comprising:
receiving, by a terminal, location information of a vehicle from a positioning system communication module mounted on the vehicle;
receiving the vehicle information from a vehicle information system;
receiving information regarding another terminal; and
setting a location of the another terminal as a destination based on a user's manipulation using the received information of the another terminal.

2. The method of claim 1, further comprising:
setting an alarm at a predetermined time before the vehicle arrives at the destination.

3. The method of claim 1, further comprising:
identifying a time when the vehicle is expected to arrive at the destination based on the location information and the information of the another terminal.

4. The method of claim 1, further comprising:
displaying current movement information of the vehicle and information regarding the destination.

5. The method of claim 1, further comprising:
setting an alarm at a predetermined distance before the vehicle arrives at the destination.

6. The method of claim 1, transmitting information regarding the destination to an external server.

7. The method of claim 6, further comprising
receiving, from the external server, information regarding an expected arrival time at the destination.

8. The method of claim 1, further comprising:
displaying current movement information of the vehicle based on information received from an external server, current location information of the vehicle, and information regarding the destination.

9. The method of claim 1, further comprising:
when a communicable connection with the communication module mounted on the vehicle is completed, inactivating an internal GPS mounted on the terminal.

10. A terminal comprising:
a communication unit which communicates with a positioning system communication module mounted on a vehicle; and
a controller configured to control:
receiving location information of the vehicle from the communication module,
receiving vehicle information from a vehicle information system based on the received location information,
receiving information regarding another terminal, and
setting a destination based on received information of another terminal based on a user's manipulation.

11. The terminal of claim 10, wherein the controller is further configured to control setting an alarm at a predetermined time before the vehicle arrives at the destination.

12. The terminal of claim 10, wherein the controller is further configured to control identifying a time when the vehicle is expected to arrive at the destination based on location information and the information of the another terminal.

13. The terminal of claim 10, wherein the controller is further configured to control displaying current movement information of the vehicle and information regarding the destination.

14. The terminal of claim 10, wherein the controller is further configured to control setting an alarm at a predetermined distance before the vehicle arrives at the destination.

15. The terminal of claim 10, wherein the controller is further configured to control transmitting, to an external server, information regarding the destination.

16. The terminal of claim 10, wherein the controller is further configured to control receiving, from the external server, information regarding an expected arrival time at the destination.

17. The terminal of claim 10, wherein the controller is further configured to control displaying current movement information of the vehicle based on information received from an external server and information regarding the destination.

18. The terminal of claim 10, further comprising:
an internal GPS configured to receive the location information,
wherein the controller, when the communication unit is communicably connected to the communication module mounted on a vehicle, is further configured to inactivate the internal GPS.

19. The method of claim 1, wherein the received information of the another terminal comprises a telephone number of the another terminal.

20. The terminal of claim 10, wherein the received information of the another terminal comprises a telephone number of the another terminal.

\* \* \* \* \*